(12) United States Patent
Thieu et al.

(10) Patent No.: US 6,451,891 B1
(45) Date of Patent: Sep. 17, 2002

(54) METHOD FOR PREVENTING OR RETARDING THE FORMATION OF GAS HYDRATES

(75) Inventors: Vu Thieu, Lodi; Kirill N. Bakeev, Ringwood; Jenn S. Shih, Paramus, all of NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/712,553

(22) Filed: Nov. 14, 2000

(51) Int. Cl.[7] .................................................. C08K 5/06
(52) U.S. Cl. ...................................... 524/376; 524/555
(58) Field of Search .................................. 524/376, 555

(56) References Cited

U.S. PATENT DOCUMENTS

| | | | | |
|---|---|---|---|---|
| 5,723,524 A | * | 3/1998 | Cohen et al. ................ | 524/376 |
| 5,874,660 A | * | 2/1999 | Colle et al. .................... | 585/15 |
| 6,028,233 A | * | 2/2000 | Colle et al. .................... | 585/15 |
| 6,117,929 A | * | 9/2000 | Bakeev et al. ............... | 524/376 |
| 6,180,699 B1 | * | 1/2001 | Bakeev et al. .............. | 524/104 |

FOREIGN PATENT DOCUMENTS

JP    58137474    *    8/1983

* cited by examiner

Primary Examiner—Judy M. Reddick
(74) Attorney, Agent, or Firm—Walter Katz; William J. Davis; Marilyn J. Maue

(57) ABSTRACT

A composition is provided herein for preventing or retarding the formation of gas hydrates or for reducing the tendency of gas hydrates to agglomerate, during the transport of a fluid comprising water and a hydrocarbon, through a conduit. The composition is a homopolymer of an N-alkyl (meth)acrylamide, N,N-dialkyl(meth)acrylamide or copolymers thereof with N-vinyl-N-methylacetamide, in a defined solvent, which homopolymers and copolymers are made and applied in the defined solvent, which, most preferably, is a low molecular weight glycol ether such as 2-butoxyethanol.

2 Claims, 1 Drawing Sheet

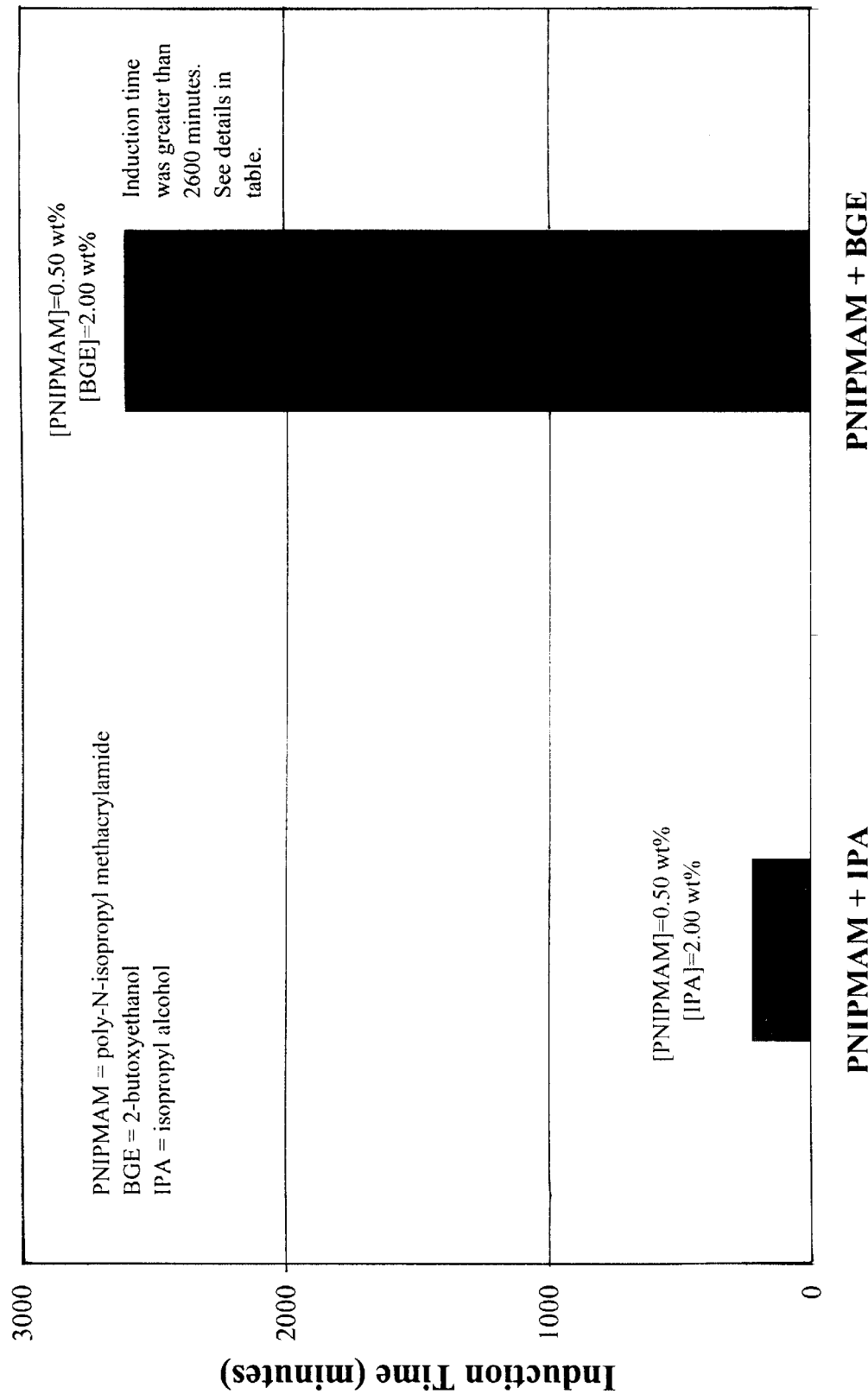

METHOD FOR PREVENTING OR RETARDING THE FORMATION OF GAS HYDRATES

BACKGROUND OF THE INVENTION

1. Field of the Invention

The invention relates to a method for preventing or retarding the formation of gas hydrates or for reducing the tendency of such hydrates to agglomerate during the transport of a fluid comprising water and a hydrocarbon through a conduit, and, more particularly, to the addition to the fluid of an N-alkyl(meth)acrylamide polymer, N,N-dialkyl(meth)acrylamide polymer and copolymers thereof with N-vinyl-N-methylacetamide, which are made and applied in a defined solvent, to inhibit such gas hydrate formation.

2. Description of the Prior Art

It is well known in the art that the formation of gas hydrates in a conduit, e.g. a pipeline, during the transport of liquids, such as oil, and gases, particularly lower hydrocarbons, e.g. methane, ethane, propane, butane, isobutane and natural gas is a serious problem, especially in areas with a low temperature in the winter season or in the sea. Generally the temperatures are so low that gas hydrate formation, due to the inevitable presence of co-produced water in the wells takes place, if no special steps are taken. Insulation decreases the chance of gas hydrate formation; however, if the field is relatively small and far away from the production platform, the costs of using insulation are too high to make such field economically attractive. It is also known to add anti-freeze compounds, for example, glycol or methanol, during transport to minimize gas hydrate formation; however, large quantities of these compounds are required to be effective which is expensive. Alkyl glycosides also have been used for this purpose.

A representation of the prior art in this field are the following U.S. Pat. Nos. 4,915,176; 5,420,370; 5,432,292; 5,723,524; 6,028,233; 6,093,863; 6,096,815 and 6,117,929; EPA 0526929A1; EPO 0323774A1; Can. Pat. Appln 2,073,577; WO 93/25798; WO 95/17579; Gas Hydrates and Hydrate Prevention 73 GPA Annual Convention, pgs 85–93; WO 96/08456; WO 96/08636; WO 93/25798; EPA 0457375A1 and WO 9412761.

SUMMARY OF THE INVENTION

What is described herein is a useful composition for effectively preventing or retarding the formation of gas hydrates, or for reducing the tendency of gas hydrates to agglomerate, during the transport of a fluid comprising water and a hydrocarbon, through a conduit, comprising an N-alkyl(meth)acrylamide homopolymer, N,N-dialkyl(meth)acrylamide homopolymer, or copolymers thereof with N-vinyl-N-methylacetamide, preferably with a suitable solvent. The homopolymer or copolymer is made and applied in a low molecular weight glycol ether, which, most preferably, is 2-butoxyethanol (BGE).

IN THE DRAWING

The Graph is a bar representation of the effectiveness as a gas hydrate inhibitor for the composition of the invention in comparison to the same polymer made in a different solvent.

DETAILED DESCRIPTION OF THE INVENTION

The polymer which exhibits advantageous inhibitory characteristics in the composition of the invention is a homopolymer of an N-alkyl(meth)acrylamide, N,N-dialkyl(meth)acrylamide or copolymer thereof with N-vinyl-N-methylacetamide, having a molecular weight of about 500 to about 1,000,000, as determined by GPC using polyethylene glycol as the standard, preferably about 1,000 to 10,000.

Generally, the polymer used is present in an amount of about 30 to 70% by weight of the composition, i.e. in admixture with the solvent. The polymer inhibition concentration in the pipeline, i.e. the aqueous phase, is about 0.1 to 3% by weight. The solvent inhibition concentration, accordingly, is about 0.1 to 5% by weight in the aqueous phase.

Desired solvents include low molecular glycol ethers containing an alkoxy group having at least 3 carbon atoms. Representative glycol ethers include 2-butoxyethanol (ethylene glycol monobutyl ether); propylene glycol butyl ether; (diethylene glycol) monobutyl ether; iso-2-butoxyethanol and 2-isopropoxy-ethanol. 2-Butoxyethanol (BGE) is preferred.

The polymers or copolymers in this invention are made in the desired solvent and maintained therein in the composition of the invention.

Preferred compounds are the following:

poly(N-isopropylmethacrylamide), PNIPMAM;

poly(N-isopropylacrylamide), PNIPAM;

poly(N-isopropylmethacrylamide-N-methylvinylacetamide) copolymer, P(NIPMAM-VIMA);

poly(N-isopropylacrylamide-N-methylvinylacetamide) copolymer, P(NIPAM-VIMA);

poly(acryloylpyrrolidine), PAPYD;

poly(methacryloylpyrrolidine), PMAPYD;

poly(acryloylpyrrolidine-N-methylvinylacetamide) copolymer, P(APYD-VIMA); and poly(methacryloylpyrrolidine-N-methylvinylacetamide) copolymer, P(MAPYD-VIMA).

The following examples are provided to illustrate the invention.

GENERAL METHOD

The gas hydrate inhibition tests were conducted in a 500 ml, 316 stainless steel autoclave vessel having a usable volume of 200 ml, equipped with a thermostat cooling jacket, sapphire window, inlet and outlet, platinum resistance thermometer (PRT) and magnetic stirring pellet. The rig is rated up to 400° C. and down to −25° C. Temperature and pressure are data logged, while the cell content is visually monitored by a boroscope video camera connected to a time lapsed video recorder. Hydrate formation in the rig is detected using a combination of three methods: visual detection of hydrate crystals, decrease in vessel pressure due to gas uptake and by the temperature exotherm created by heat released during hydrate formation.

The rig was cleaned prior to running a blank and/or test solutions. An air drill with wet and dry emery paper was used to remove traces of any adsorbed chemicals therein with a small amount of water added to the rig. The vessel was then rinsed several times with double distilled water. A blank solution of 200 ml of double distilled water was run to confirm test reproducibility. The formation of hydrates within 7–15 minutes was taken as a standard time for a given set of testing conditions, i.e. synthetic gas, 60 bar and 4° C. The cleaning procedure was repeated until a reproducible time was achieved.

Synthetic gas mixture was used for hydrate testing:

| Component | Mol % |
|---|---|
| $CO_2$ | 1.0 |
| Methane | 95.31 |
| Ethane | 2.96 |
| Propane | 0.53 |
| Iso-Butane | 0.1 |
| n-Butane | 0.1 |

Experimental Procedure for Evaluation of Hydrate Inhibitors 200 ml of pre-cooled polymer solution (with total concentration equal to 0.5 wt %) was placed into the vessel, followed by a PTFE stirrer pellet. The rig top was replaced and the securing ring tightened. The boroscope and video camera were then attached to the apparatus. The rig was then stirred and allowed to cool to the required temperature. Upon reaching the pre-set temperature, the stirrer was stopped and the video recorder and computer data logger started. The rig was then charged with synthetic gas to reach the required pressure. A slightly higher pressure (2–3 bars) was used to allow for some gas dissolution in the water and the slight drop in the pressure as the gas cools. The stirrer was started at 500 rpm and the temperature (4° C.), pressure (85 bar) and start time ($t_o$) recorded. The run was terminated upon the formation of hydrates, usually at the moment of a pressure drop, which might or might not follow the exotherm and visual hydrates formation depending on the amount of the hydrates formed and the amplitude of the effect. The final temperature, pressure and time (t) of the hydrates formation were noted.

The onset of the hydrate formation time=$t-t_o$ (mins) is indicated in the examples given below. The relative efficiencies of the inhibiting polymers are thus proportional to the measured induction times.

Since the equilibrium melting temperature for hydrate decomposition for the synthetic gas in double distilled water and P=85 bar is about 15.5° C., the hydrate sub-cooling is equal to 11.5° C. (T=4° C. is the temperature of the measurements).

Preparation of Polymers

Example 1 below illustrates the direct preparation of poly(N-isopropylmethacrylamide) in 2-butoxyethanol (BGE), which shows excellent hydrate inhibition as compared to the same polymer prepared in isopropanol (IPA) and then tested in IPA (see comparative Example below).

INVENTION EXAMPLE

Poly(N-Isopropyl Methacrylamide) In 2-Butoxyethanol

Into a 1-I, 4-neck resin kettle, fitted with a stainless steel anchor agitator, a nitrogen purge dip tube, an adapter and a reflux condenser, added 50 g of N-isopropyl methacrylamide and 200 g of 2-butoxyethanol. The mixture was heated to 150° C. while purging with nitrogen. After reaching this temperature, it was purged with nitrogen for another ½ hour. Then 1.0 g of di-t-butyl peroxide was added. The reaction mixture then was held at 150° C. for 1.5 hours. Then 8 booster shots of 0.25 g each of di-t-butyl peroxide were added every 1.5 hours. 1.5 hours after the last booster was charged, the mixture was cooled to room temperature. The molecular weight of the polymer was about 2,000, as measured by GPC with polyethylene glycol standard.

COMPARATIVE EXAMPLE

Poly(N-Isopropyl Methacrylamide) in IPA

Into a 1-I, 4-neck resin kettle, fitted with a stainless steel anchor agitator, a nitrogen purge dip tube, an adapter and a reflux condenser, was added 50 g of N-isopropyl methacrylamide and 200 g of isopropanol. The mixture was purged with nitrogen throughout the run and heated to 83° C. After the temperature reached 83° C., purged with nitrogen for ½ hour and added 2.0 g of initiator t-butylperoxy pivalate (Lupersol 11). The reaction mixture was held at 83° C. for 1.5 hours. Then 6 booster shots of 0.25 g each of t-butylperoxy pivalate were added every 1.5 hours. 1.5 hours after the last booster was charged, the mixture was cooled to room temperature. The molecular weight of the polymer was about 2,000.

Both the Invention and Comparative Examples were evaluated for effectiveness as a gas hydrate inhibitor by the procedure described above. The test results are presented in graphical form in the Figure and in the Table. The performance of each demonstrates the remarkable difference in induction times for polymer synthesized in BGE as compared to the same polymer made in IPA.

TABLE

Performance Comparison of PNIPMAM Synthesized in BGE or IPA
Synthetic Gas; P = 85 bars; T = 4° C.

| Run # | PNIPMAM[a] in BGE Induction Time (mins) | PNIPMAM[b] in IPA Induction Time (mins) |
|---|---|---|
| 1 | 2600 | 330 |
| 2 | 3000[c] | 190 |
| 3 | 3000[c] | 145 |
| 4 | 4000[c] | — |
| 5 | 4000[c] | — |
| 6 | 4000[c] | — |

[a]Test solution contained [PNIPMAM] = 0.5 wt % and [BGE] = 2.0 wt % in distilled $H_2O$.
[b]Test solution contained [PNIPMAM] = 0.5 wt % and [IPA] = 2.0 wt % in distilled $H_2O$.
[c]Bold numbers indicate run was terminated at that time. The sample was, therefore, effective to times greater than induction times in bold.
PNIPMAM = poly-N-isopropyl methacrylamide
BGE = 2=butoxyethanol
IPA = isopropyl alcohol while the invention has been described with particular reference to certain embodiments thereof, it will be understood that changes and modifications may be made which are within the skill of the art. Accordingly, it is intended to be bound only by the following claims, in which:

What is claimed is:

1. A method for preventing or retarding the formation of gas hydrates or for reducing the tendency of gas hydrates to agglomerate, during the transport of a fluid comprising water and a hydrocarbon, through a conduit, which comprises adding to said fluid a gas hydrate inhibiting polymer or copolymer comprising, (a) a homopolymer of N-alkyl (meth)acrylamide, N,N-dialkyl(meth)acrylamide or copolymer thereof with N-vinyl-N-methylacetamide, and (b) a glycol ether solvent which contains an alkoxy group having at least 3 carbon atoms, wherein said homopolymer or copolymer is synthesized and used in said solvent.

2. A method according to claim 1 wherein said solvent is 2-butoxyethanol.

* * * * *